(12) United States Patent
Balsiger

(10) Patent No.: US 7,518,328 B2
(45) Date of Patent: Apr. 14, 2009

(54) METHOD AND DEVICE FOR COMMUTATING ELECTROMECHANICAL ACTUATORS

(75) Inventor: Werner Balsiger, Schönbühl-Urtenen (CH)

(73) Assignee: Saia-Burgess Murten AG, Murten (CH)

( * ) Notice: Subject to any disclaimer, the term of this patent is extended or adjusted under 35 U.S.C. 154(b) by 363 days.

(21) Appl. No.: 10/586,259

(22) PCT Filed: Jan. 17, 2005

(86) PCT No.: PCT/CH2005/000020

§ 371 (c)(1),
(2), (4) Date: Jul. 18, 2006

(87) PCT Pub. No.: WO2005/069480

PCT Pub. Date: Jul. 28, 2005

(65) Prior Publication Data

US 2008/0224639 A1 Sep. 18, 2008

(30) Foreign Application Priority Data

Jan. 19, 2004 (WO) .............. PCT/CH2004/000028

(51) Int. Cl.
*H02H 7/09* (2006.01)

(52) U.S. Cl. .................. 318/400.22; 318/599; 318/811

(58) Field of Classification Search ............ 318/400.22, 318/432, 434, 599, 811
See application file for complete search history.

(56) References Cited

U.S. PATENT DOCUMENTS

| 4,520,302 | A |   | 5/1985  | Hill et al.       |          |
|-----------|---|---|---------|-------------------|----------|
| 4,658,194 | A |   | 4/1987  | Richter et al.    |          |
| 5,173,650 | A |   | 12/1992 | Hedlund           |          |
| 5,254,914 | A | * | 10/1993 | Dunfield et al.   | 318/400.34 |
| 5,841,252 | A | * | 11/1998 | Dunfield          | 318/400.32 |
| 6,140,792 | A | * | 10/2000 | Kameyama et al.   | 318/685  |
| 6,720,686 | B1| * | 4/2004  | Horst             | 310/51   |

FOREIGN PATENT DOCUMENTS

EP          0 151 296 A2    12/1984

* cited by examiner

*Primary Examiner*—Rina I Duda
(74) *Attorney, Agent, or Firm*—Foley & Lardner LLP

(57) ABSTRACT

The invention relates to the commutation of electromechanical, commutatorless actuators, more particularly of permanent magnet motors and reluctance motors, having a rotor and a stator including at least one stator winding (W1, W2) that is/are operated with a constant current ($I_{PWM}$). The method for determining the moment of commutation used herein comprises the following steps: A reference constant current is applied to at least one of the windings (W1, W2) and a stationary state is awaited. Then, a value that represents the voltage applied to the winding of the actuator in the stationary state is determined as the reference commutation value for the commutation voltage. While the motor is running, the commutation (if the motor is being operated with the reference current) is performed as soon as the reference value appears or a specified time later.

15 Claims, 6 Drawing Sheets

US 7,518,328 B2

METHOD AND DEVICE FOR COMMUTATING ELECTROMECHANICAL ACTUATORS

CROSS-REFERENCE TO RELATED APPLICATION

This application is the National Phase of PCT/CH2005/000020, filed Jan. 17, 2005, and published as WO 2005/069480, which in turn claims priority from PCT/CH2004/000028, filed Jan. 19, 2004, and published as WO 2005/069479, the contents of which are hereby incorporated by reference.

BACKGROUND OF THE INVENTION

The invention relates to a method for commutating electromechanical, commutatorless actuators, more particularly of permanent magnet motors and reluctance motors, having a rotor and a stator including at least one stator winding (W1, W2) that is/are operated with a constant current (I), and to a device for implementing the method.

Brushless electric motors (more generally: electromechanical, or more precisely electromagnetic actuators) have electronic switches (e.g. transistors) instead of so-called brushes (mechanical contacts). These switches serve to electronically commutate the motor, i.e. they determine the direction of the current in the motor windings as a function of the rotor position and of the desired direction of rotation. The rotor position is measured by means of magnetic or optical sensors. Sensorless brushless electric motors do not use sensors for measuring the rotor position but estimate the position of the rotor indirectly by measuring the currents and voltages of the motor windings. The result are reduced costs and an improved reliability of the motor. Brushless and sensorless brushless electric motors are in the form of permanent magnet or reluctance motors.

There are different methods for the sensorless commutation of permanent magnet and reluctance motors. In one group of methods, the rotor position is calculated from the motor voltages and currents using mathematical models. These methods are very demanding and therefore associated with high costs: The motor voltages and currents have to be measured, the parameters of the motor must be known (i.e. they have to be measured before for each motor type or estimated in operation), and complex calculations have to be performed very rapidly.

Another group of methods uses the back EMF voltage of the motor as a source of information. To this end, on one hand, the back EMF voltage is estimated from the motor voltages and currents (see above). On the other hand, the back EMF voltage of a motor winding can be directly measured in the currentless state. The disadvantage is that that motor winding, as it is currentless, cannot be used for producing a torque so that a motor of the same rating will produce a smaller torque. This is particularly significant in motors having a small number of windings.

In U.S. Pat. No. 4,520,302, Acarnley et al. describe a method where the rotor position is estimated by measuring the inductance of the motor coils. This inductance is a function of the magnetic flux of the rotor and of the current in the winding itself. In this method, the motor windings are controlled by a pulsed driver (chopper, PWM driver) and the on- and off-times of the pulsed driver are measured. Inductance is calculated from the ratio of current variation $\Delta I$ per time interval $\Delta t$.

The advantage is that the method, which uses a mere time measurement, can be implemented in a simple and economical way and that the nominal current flows in the motor winding during the measurement so that the latter can produce a torque. The method also works when the motor is at standstill.

It is an object of the invention to provide a method and a device that allow a simpler and thus more economical commutation of brushless electromechanical actuators than the approaches of the prior art.

BRIEF SUMMARY OF THE INVENTION

The teaching of the invention is explained in more detail hereinafter by means of a preferred exemplary embodiment and with reference to the figures. In the description of FIGS. 1-6, a method is presented that allows a particularly simple detection of the zero crossover of the back EMF voltage. The commutation of the motor winding preferably occurs near this zero crossover of the back EMF voltage and in certain cases a predetermined time interval after that zero crossover point, which is substantiated and explained in more detail below (from equation 12 on). These findings allow a particularly simple and efficient method for the sensorless commutation of the motor winding that will ultimately be discussed in more detail with reference to FIGS. 8 to 11 using a permanent magnet stepper motor as an example.

BRIEF DESCRIPTION OF THE DRAWINGS

In particular.

DETAILED DESCRIPTION OF THE PREFERRED EMBODIMENT

Figure 1:
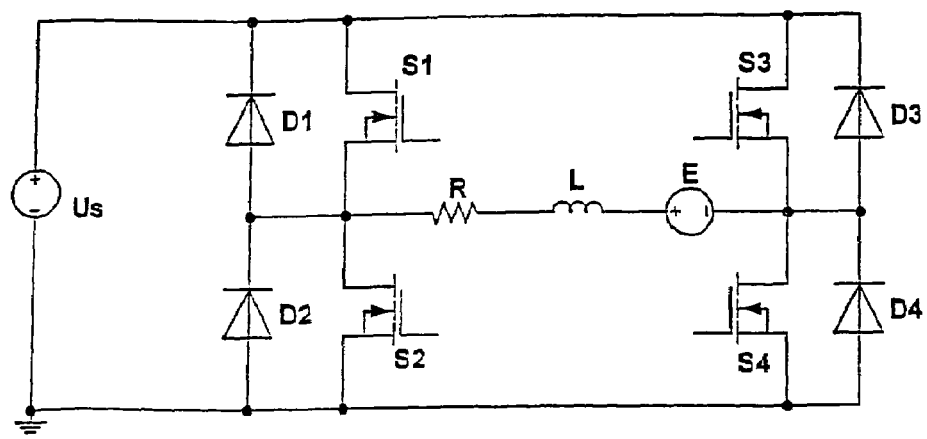
FIG. 1 shows the circuit diagram of a motor winding controlled by a bipolar driver, FIG. 2 the time characteristic of the current in the motor winding of FIG. 1, FIG. 3 the normalized time characteristic of the current in the motor winding and of the duty cycle when the current is switched on, FIG. 4 the normalized time characteristics of winding current, duty cycle, and back EMF voltage during the start-up phase of the motor, FIG. 5 the time characteristics of the parameters shown in FIG. 4 during overloaded operation, FIG. 6 the time characteristics of the parameters shown in FIG. 4 during nearly completely overloaded operation, FIG. 7 the back EMF voltage, the winding current and the product thereof as a function of the rotor position, FIG. 8 the diagram of a control circuit for a two-phase stepper motor with sensorless control, FIG. 9 the switching states of the pulsed drivers of this stepper motor while it is operated in full step mode (2-phase ON), FIG. 10 a process chart of the operations during a start-up step of the motor of FIG. 8, FIG. 11 a process chart of the operations during the first motor step, FIG. 12 a graph illustrating the determination of the initial value for a predetermined chopper period $T_{CH}$, and FIG. 13 a graph in analogy to FIG. 12 for a predetermined chopper on-time.

FIG. 1 shows the circuit diagram of a motor winding controlled by a bipolar driver. The motor winding is modeled by winding resistance R, winding inductance L, and by a back EMF voltage source E. The back EMF voltage is induced by the variation of the magnetic flux of the rotor. It is generally sinusoidal or trapezoidal.

The motor winding is controlled by a switched driver. In the present example, the latter is a H-bridge or a bipolar driver, but the method can also be implemented using an unipolar driver or any other driver topology.

The H-bridge comprises four switching transistors $S_1$-$S_4$ by which the motor winding is connectable to a supply voltage $U_S$. In parallel to switching transistors $S_1$-$S_4$, recovery diodes $D_1$-$D_4$ are provided. When switching transistors $S_1$ and $S_4$ (or $S_3$ and $S_2$, respectively) are switched on, a current flows from $U_S$ through R, L, and E. This current is measured in a switching transistor or in a an additional measuring resistor (shunt), which is not represented in FIG. 1.

Upon reaching a given criterion explained hereinafter with reference to FIG. 2, switching transistor $S_2$ (or $S_4$) is switched off. The current will then continue to flow through recovery diode $D_3$ (or $D_1$, respectively). When another criterion (see below) is fulfilled, the switching transistor is switched on again. Alternatively, both switching transistors may be switched off. In this case, the current will flow back to $U_S$ in a so-called "regenerative" manner. This will not be discussed further here, but the method functions in this case also.

Figure 2:
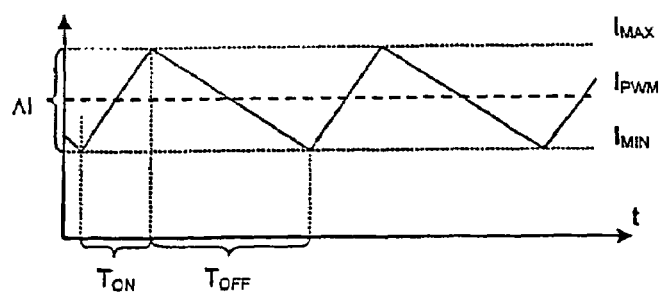

FIG. 2 shows the basic current characteristic in the motor winding that results from switching the pulsed driver: During on-phase $T_{ON}$, the current (in a first approximation) rises linearly up to a maximum value $I_{MAX}$. During off-phase $T_{OFF}$, the current drops to minimum value $I_{MIN}$. Generally, the criterion for switching off the current is that maximum current value $I_{MAX}$ has been attained.

Possible criteria for switching the current on (again) are: the current reaches or falls below a minimum current value $I_{MIN}$; a specified switch-off time $T_{OFF}$ is reached or exceeded; or the duration of the period $T_{ON}+T_{OFF}$ is reached or exceeded.

The pulsed driver is switched on and off at a frequency that is significantly higher than the electrical or mechanical time constant of the motor. The result is a winding current $I_{PWM}$ whose average value is fairly approximately constant. The ripple $\Delta I$ of the current is small as compared to current $I_{PWM}$.

As a matter of principle, the described method is independent from the manner in which the on- and off-times are generated and maintained stable. Different methods are known in the art and have been described in the literature (e.g. by Mitchell, *DC-DC Switching Regulator Analysis*). Usually, the current is switched on when $I_{MAX}$ is reached and again switched off when $T_{OFF}$ is reached. The method will be described in detail hereinafter for this specific case.

During on-phase $T_{ON}$, $$U_S = R \cdot I + sL \cdot I + E + 2 \cdot U_{DS} \tag{1}$$

During off-phase $T_{OFF}$, $$0 = R \cdot I + sL \cdot I + E + U_{DS} + U_{Diode} \tag{2}$$

Here, $U_{DS}$ represents the drain-source voltage across a switching transistor and $U_{Diode}$ the diode voltage. The state space averaging method (e.g. described in the previously cited publication by Mitchell) allows to transform the two time-discrete states (equations 1 and 2) into a continuous representation (equation 3). If, in a first approximation, $U_{DS}$ and $U_{Diode}$ are neglected (or modeled as resistances and added to the ohmic resistance R of the motor winding), the result is:

$$d \cdot U_S = R \cdot I + sL \cdot I + E \tag{3}$$

where $$d = \frac{T_{ON}}{T_{ON} + T_{OFF}} \tag{4}$$

The ratio between the on-time and the entire period (equation 4) is also called "duty cycle".

If the current I is kept constant, $$I = I_{PWM} = \text{constant} \tag{5}$$

then equation 3 becomes $$d \cdot U_S = R \cdot I_{PWM} + E \tag{6}$$

or $$E = d \cdot U_S - R \cdot I_{PWM} \tag{7}$$

In many cases, supply voltage $U_S$ and winding resistance R are known or easy to measure. According to the above assumption, current $I_{PWM}$ is kept at a known and constant value by the pulsed driver; i.e. the current need not be measured. It is noted that the winding inductance does not appear in equation 7 and does not influence the measurement of the back EMF voltage.

Thus, the back EMF voltage according to equation 7 can be determined merely by measuring the on- and off-times $T_{ON}$ and $T_{OFF}$ of the pulsed driver. In practice, the information whether the pulsed driver is switched on or off is already available in the form of digital signals. The measurement of the on- and off-times can be accomplished simply, economically, and very precisely without additional measuring sensors e.g. by digital circuits (timers).

For the sensorless commutation of electric motors, the exact value of the back EMF voltage according to equation 7 is generally not necessary but the knowledge of the zero crossover point is sufficient, i.e. the moment when the back EMF voltage reaches zero.

For E=0, equation 6 or equation 7, respectively, reduces to $$d_0 = \frac{R \cdot I_{PWM}}{U_S} \tag{8}$$

The duty cycle, designated by $d_0$, at the zero crossover point of the back EMF voltage is easily calculated from the winding resistance R, the current $I_{PWM}$, and the supply voltage $U_S$. If one or several of these parameters are not exactly known or may vary in operation or in the course of the lifetime, it is also possible to measure this duty cycle $d_0$ in a simple manner. Per definition, the back EMF voltage E is zero when the motor is at standstill. Basically, winding resistance R and supply voltage $U_S$ do not vary when the motor is at standstill. The duty cycle at standstill of the motor therefore corresponds to $d_0$, so that it is sufficient to measure the duty cycle while the motor is at standstill, e.g. shortly before starting up the motor, in order to determine $d_0$.

The duty cycle according to equation 4 is calculated from the on- and off-times $T_{ON}$ and $T_{OFF}$. In practice, $T_{OFF}$ is often kept constant, e.g. by a monoflop (monostable multivibrator), i.e. the only variable parameter is $T_{ON}$. Thus, instead of duty cycle d, $T_{ON}$ is being calculated or measured, respectively.

Hence, equation 8 and equation 4 yield $$T_{ON0} = \frac{R \cdot I_{PWM}}{U_S - R \cdot I_{PWM}} T_{OFF} \qquad (9)$$

Hereinafter, the characteristic of the duty cycle (according to equation 6) for different back EMF voltages will be described. The charts are based upon the simulation of a motor having a sinusoidal back EMF voltage. The current and voltage values have been normalized to 1 and 100%, respectively. The explanations are therefore independent from motor parameters.

Figure 3:
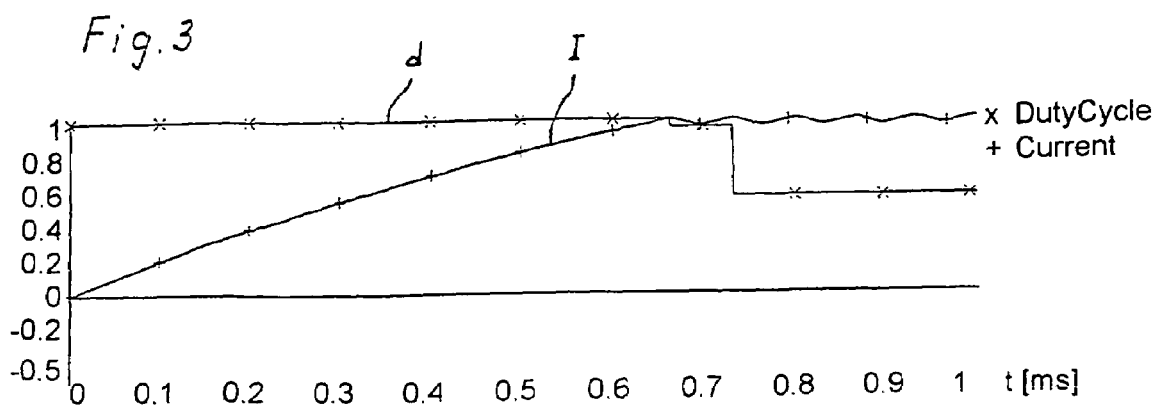

FIG. 3 shows the characteristic of winding current I as a function of time. The current rises exponentially (L-R element) up to current maximum $I_{MAX}$ (100%). At the same time, duty cycle d is illustrated. During the exponential current rise, duty cycle d is equal to 100% as the pulsed driver is always on. As soon as winding current I reaches maximum value $I_{MAX}$, the pulsed driver starts switching on and off periodically. The current now has a constant average value $I_{PWM}$ and the characteristic shape shown in FIG. 2.

Here, the back EMF voltage is still zero. While the winding current is switched on, duty cycle d is always 100% and therefore the back EMF voltage cannot be measured during this phase.

Figure 4:
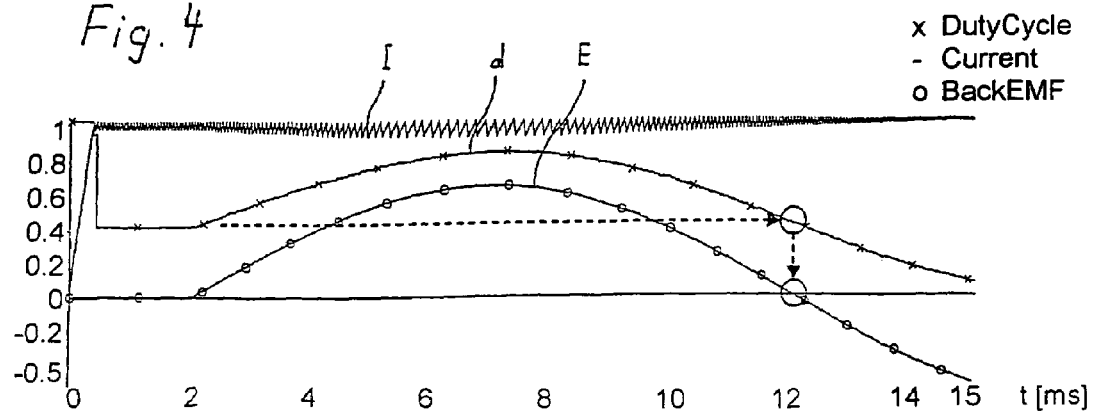

FIG. 4 shows the characteristic of winding current I and of duty cycle d for an assumed sinusoidal back EMF voltage E. At the beginning, the exponential rise of winding current I is observed as described above. Subsequently, the winding current remains at the constant value $I_{PWM}$. During a first phase (during which the back EMF voltage is still zero), duty cycle d remains at a constant value (here approx. 40%). After a certain time (here approx. 2 ms), back EMF voltage E begins to rise while the winding current is kept constant at $I_{PWM}$ by the pulsed driver. Here, the duty cycle increases at the same rate as the back EMF voltage, which is easily explained or calculated, respectively, by means of equation 6.

At approx. 7 ms, back EMF voltage E reaches a maximum simultaneously with duty cycle d. Subsequently, back EMF voltage E decreases and reaches the zero crossover point at approx. 12 ms. Duty cycle d also decreases and at the zero crossover point of back EMF voltage E reaches the same value as at standstill of the motor (i.e. here again approx. 40%).

To allow the pulsed driver to always operate in the pulsed mode, the following condition must be fulfilled:

$$U_S > R \cdot I_{PWM} + E \qquad (10)$$

If the pulsed driver remains switched on for a prolonged period (duty cycle always 100%), the nominal winding current is possibly no longer attained, back EMF voltage E cannot be measured any more, and the above condition is not fulfilled. We call this operating mode "overloaded operation".

Figure 5:
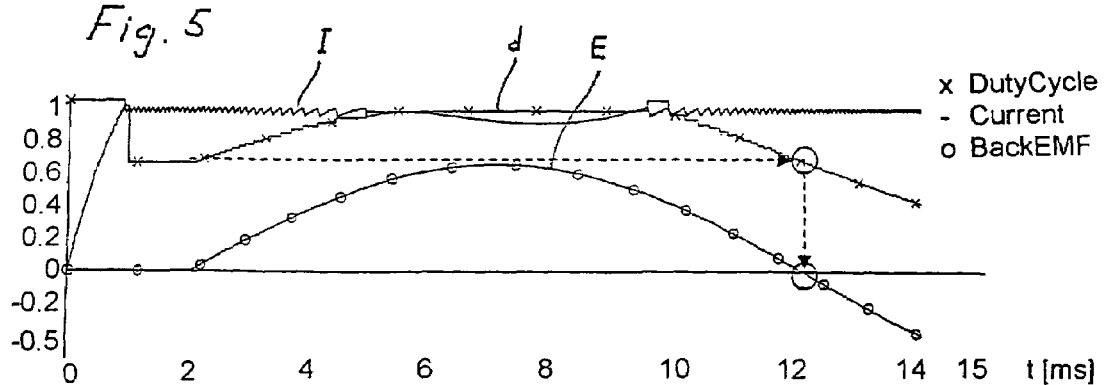

FIG. 5 shows the characteristic in partially overloaded operation. In the area of the back EMF voltage maximum, the condition according to equation 10 is violated. In this area, maximum current value $I_{MAX}$ is no longer attained and the value of the current is merely determined by the winding resistance and inductance and by the voltage difference ($U_S - E$). A measurement of back EMF voltage E according to equation 7 is no longer possible in this region since no usable duty cycle d can be measured, respectively since the prerequisite for equation 7, namely that the winding current is constant (I=constant; equation 5), is no longer fulfilled. However, the zero crossover of back EMF voltage E can nevertheless be measured since the condition according to equation 10 is again fulfilled when back EMF voltage E declines toward zero.

Basically, the zero crossover of back EMF voltage E can be measured as long as $$U_S > R \cdot I_{PWM} \qquad (11)$$

is fulfilled, i.e. as long as supply voltage $U_S$ is greater than the ohmic voltage drop of nominal current $I_{PWM}$ of the pulsed driver.

In practice, this condition (equation 11) is presumably fulfilled for the most diverse motor types across a large voltage range as the voltage drop $R \ast I_{PWM}$ is likely to be small as compared to supply voltage $U_S$ (and to back EMF voltage E) in order to keep the efficiency of the motor high and thermal losses small.

Figure 6:
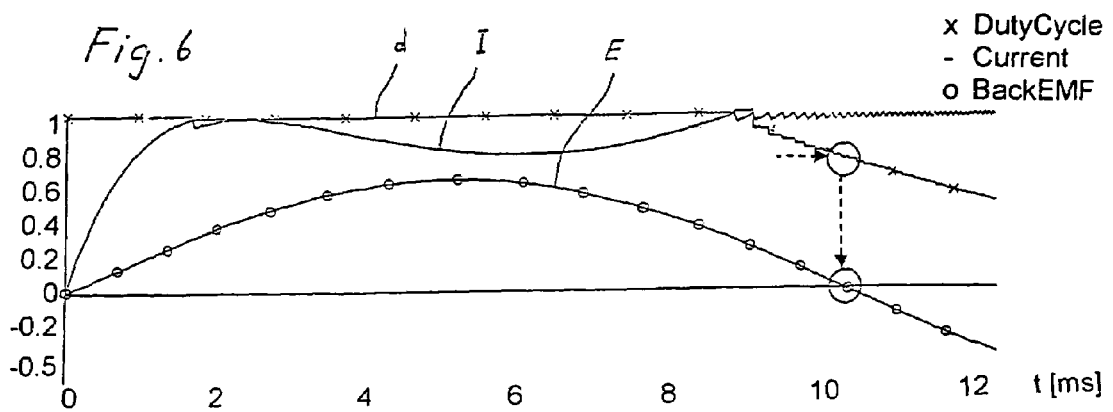

FIG. 6 shows the characteristic in nearly completely overloaded operation. The condition according to equation 10 is not fulfilled over almost the entire range. Winding current I is not limited by the pulsed driver and back EMF voltage E cannot be measured. In the area of the zero crossover of back EMF voltage E, the pulsed driver returns to normal operation and the condition according to equation 10 respectively equation 11 is fulfilled, so that the zero crossover of back EMF voltage E can be determined.

The zero crossover of the back EMF voltage is reached at the point where duty cycle d reaches the value $d_0$. As described above, the value of $d_0$ is calculated according to equation 8 or measured during motor standstill and temporarily stored.

The moment of commutation of the motor winding is preferably chosen near the zero crossover of the back EMF voltage, which is substantiated and explained in more detail below:

As mentioned with reference to FIG. 1, a motor winding is modeled as a serial connection of winding resistance R, winding inductance L, and back EMF voltage source E. Inductance and back EMF can be derived as follows by means of the induction law:

$$U_S = R \cdot I + \frac{d\psi(\alpha, I)}{dt} \qquad (12)$$

where
  $\Psi$ coil flux (Vs)
  $\alpha$ rotor angle $$U_S = R \cdot I + \frac{\partial \psi}{\partial I} \cdot \frac{dI}{dt} + \frac{\partial \psi}{\partial \alpha} \cdot \frac{d\alpha}{dt} = \qquad (13)$$
$$R \cdot I + L \cdot \frac{dI}{dt} + \frac{\partial \psi}{\partial \alpha} \cdot \omega = R \cdot I + L \cdot \frac{dI}{dt} + E$$

where
  $\omega$ angular velocity of the rotor

Winding inductance L models the variation of the coil flux due to the winding current; back EMF voltage E is generated (induced) by the variation of the coil flux due to the variation of the rotor angle. The summands of the above equation are voltages. When equation 13 is multiplied by winding current I, a momentary power is obtained for each term.

$$U_S \cdot I = R \cdot I^2 + L \cdot \frac{dI}{dt} \cdot I + E \cdot I \quad (14)$$

$U_S*I$ is the electrical power that is momentarily dissipated by the motor winding; $R*I^2$ are the thermal losses, and the term $$L \cdot \frac{dI}{dt} \cdot I$$

is the idle power of winding inductance L.

The term E*I represents the momentarily transformed electromagnetic power. This power is entirely or partially transformed into mechanical power. The remainder are losses or powers that are temporarily stored in the magnetic field.

$$P_{ElMAG} = E \cdot I = P_V + P_{Mech} = P_V + M \cdot \omega \quad (15)$$

where
M torque (Nm)
$P_V$ dissipation loss/power stored in the magnetic field
When the losses Pv are neglected, the torque of motor M can be calculated as follows:

$$M = \frac{E \cdot I}{\omega} \quad (16)$$

The torque M according to equation 16 is the "inner" torque, i.e. mechanical losses are not taken into account.

It becomes apparent in this simplified model that the momentary torque of the motor is a function of the product E*I (back EMF voltage E times winding current I). If this product is positive, the momentary torque is positive as well, i.e. it is a "motor" torque; if the product is negative, then the torque is negative, i.e. it is a "generator" or "braking" torque.

Figure 7:
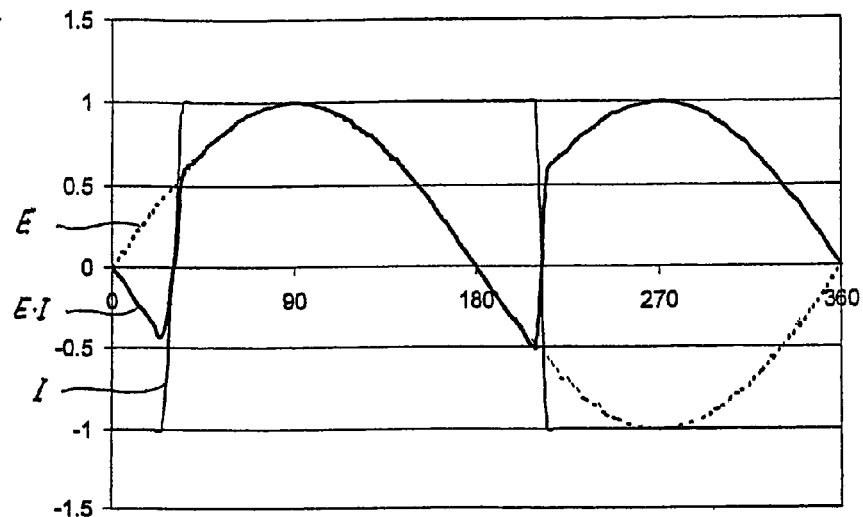

FIG. 7 shows the back EMF, the current and the product of back EMF and current (E*I) for a general case. It is clearly apparent that the product E*I is sometimes positive and sometimes negative. The considered motor is in an operating mode in which both (motor and generator torque) conditions exist, i.e. the rotor is alternately accelerated and decelerated. This causes strong vibrations of the motor and of the structures that are connected to the motor. These vibrations may also cause noise or loud noise, respectively. To avoid these vibrations, torque M should always be positive or always negative, respectively. This is accomplished by keeping the product E*I always positive (always negative).

Back EMF voltage E is a function of rotor position α respectively of angular velocity ω. Hence, it cannot be directly influenced by the control circuitry. Thus, only winding current I can be directly influenced by the control circuit in order to be able to keep the product E*I always positive (always negative). Ideally, this is accomplished by changing the direction of the winding current at the zero crossover of back EMF voltage E, thereby also producing the maximum torque. However, in certain operating modes, the windings are temporarily currentless, and in such cases it is sometimes possible or appropriate to perform the commutation a predetermined time interval after the zero crossover of the back EMF voltage, however without generating torque pulses in the opposite direction. In real motors, the electrical time constant of the motor winding has to be taken into account and the control has to be changed a little earlier already, i.e. generally before the zero crossover of the back EMF voltage.

Hereinafter, the sensorless commutation will be explained in more detail using a permanent stepper motor having two phases.

Figure 8:
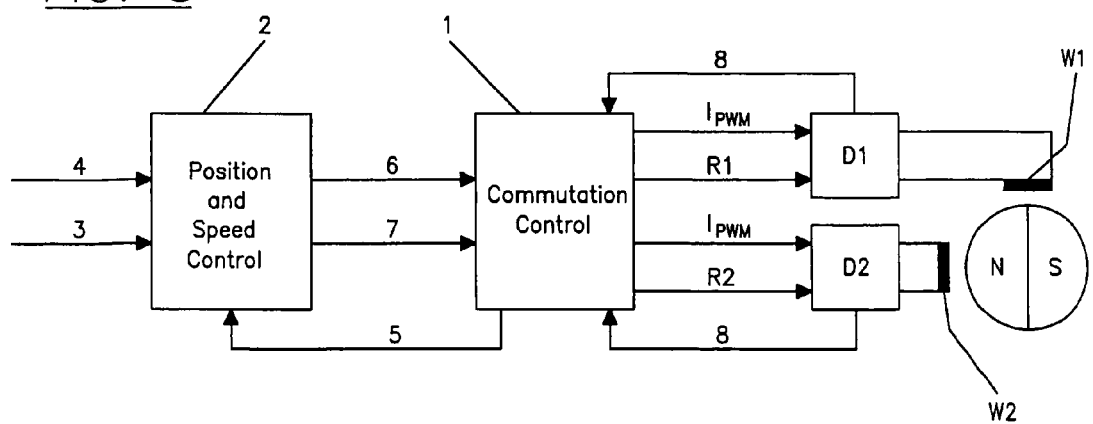

FIG. 8 schematically shows a circuit for the sensorless control of such a motor. The circuit comprises a stepper motor having a stator with two windings W1, W2 and a permanent magnet rotor, two pulsed drivers D1, D2 for the control of motor windings W1, W2, a control 1 for commutation, and a control 2 for the desired position and speed.

Position and speed control 2 receives a desired position 3 of rotor R and the maximum allowable speed 4 for attaining that desired position 3 and is informed of the momentary rotor position 5 by commutation control 1. Based on these data, position and speed control 2 delivers the required rotation direction 6 and the required winding current 7 to commutation control 1. Based on these specifications and on the momentary rotor position, commutation control 1 determines directions R1, R2 of the currents in windings W1, W2.

The control of windings W1, W2 is accomplished in pulsed operation as previously described with reference to FIGS. 1-6. Drivers D1, D2 are supplied with signals which determine the magnitude and direction of winding current $I_{PWM}$. Drivers D1 and D2 deliver respective signals 8 (driver ON/OFF) indicating the switching state (on or off) of the driver.

Figure 9:
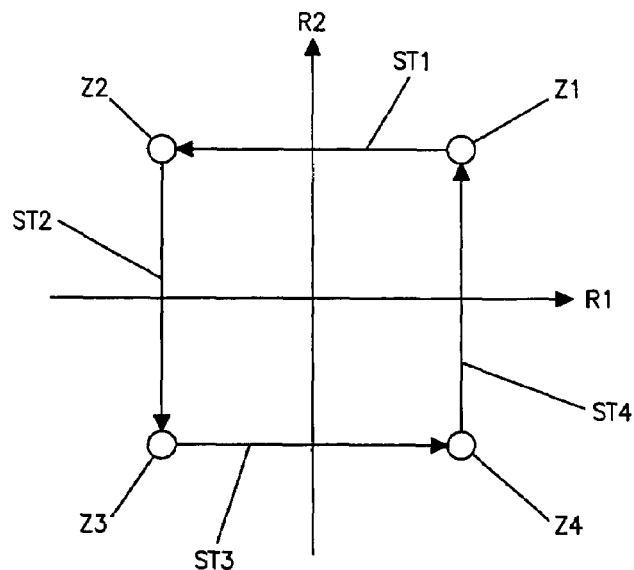

Full step mode includes four possible states. FIG. 9 shows the commutation between the four states Z1-Z4 for the positive rotation direction of the motor (CCW, counterclockwise). In the negative rotation direction (CW, clockwise), the states are recalled in the inverse order. As explained above, steps ST1-ST4 from one state to the next one are ideally carried out during the zero crossover of back EMF voltage E. This zero crossover is recognized as described above with reference to equation 8.

Figure 10:
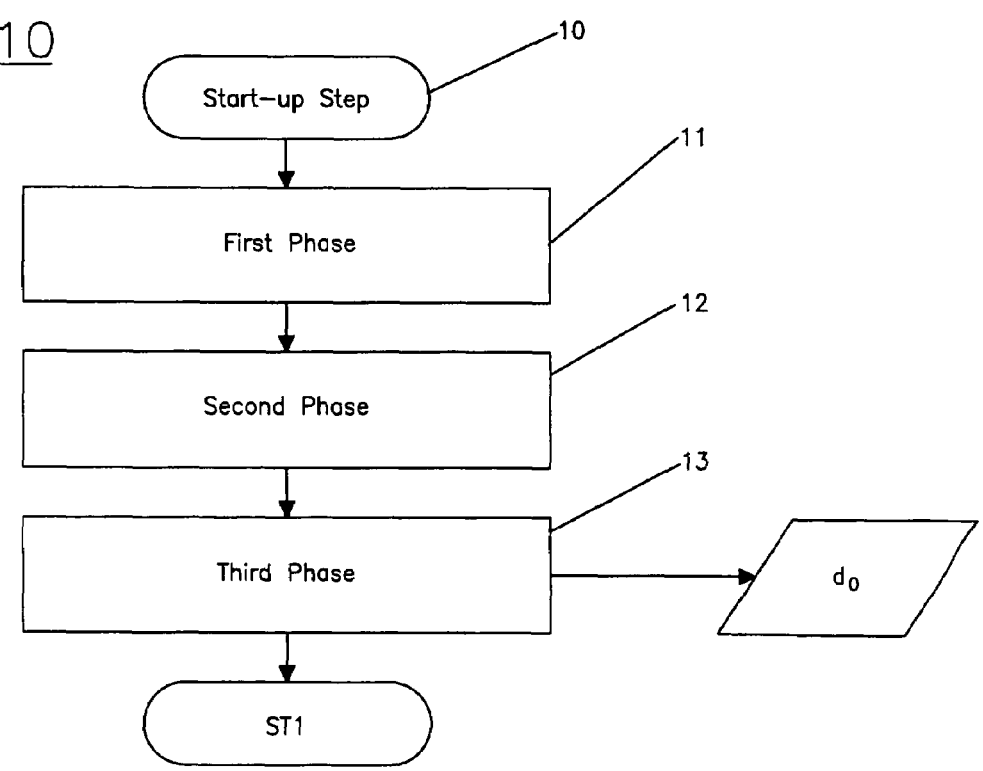

In FIG. 10, the operations that are performed in preparation of the commutations during a start-up step 10, i.e. while the motor is being started, are shown in the form of a process chart. In a first phase 11, drivers D1 and D2 are switched on and the amplitude of current $I_{PWM}$ and its direction (positive direction in coils W1 and W2) are determined.

Then, in a second phase 12, the stationary state is awaited, i.e. when the electrical and mechanical transient processes have decayed. Depending on the motor type, this waiting time lasts for some milliseconds to tenths of seconds. Instead of a fixed waiting time, it is also possible to perform a periodical measurement of the on- and off-times ($T_{ON}$ and $T_{OFF}$) of drivers D1 and D2. As long as transient processes are going on, these times are fluctuating. The stationary state has been attained as soon as the on- and off-times $T_{ON}$ and $T_{OFF}$ reach constant values.

Ultimately, in a third phase 13, the on- and off-times $T_{ON}$ and $T_{OFF}$ of drivers D1 and D2 are measured in the stationary state and duty cycle $d_0$ is calculated on the basis of the measured values (equation 4) and stored. In the case of a constant off-time $T_{OFF}$, the calculation of the duty cycle may be omitted. In this case, instead of duty cycle d, on-time $T_{ON}$ is used as the variable parameter, as already mentioned above with reference to equation 9.

Figure 11:
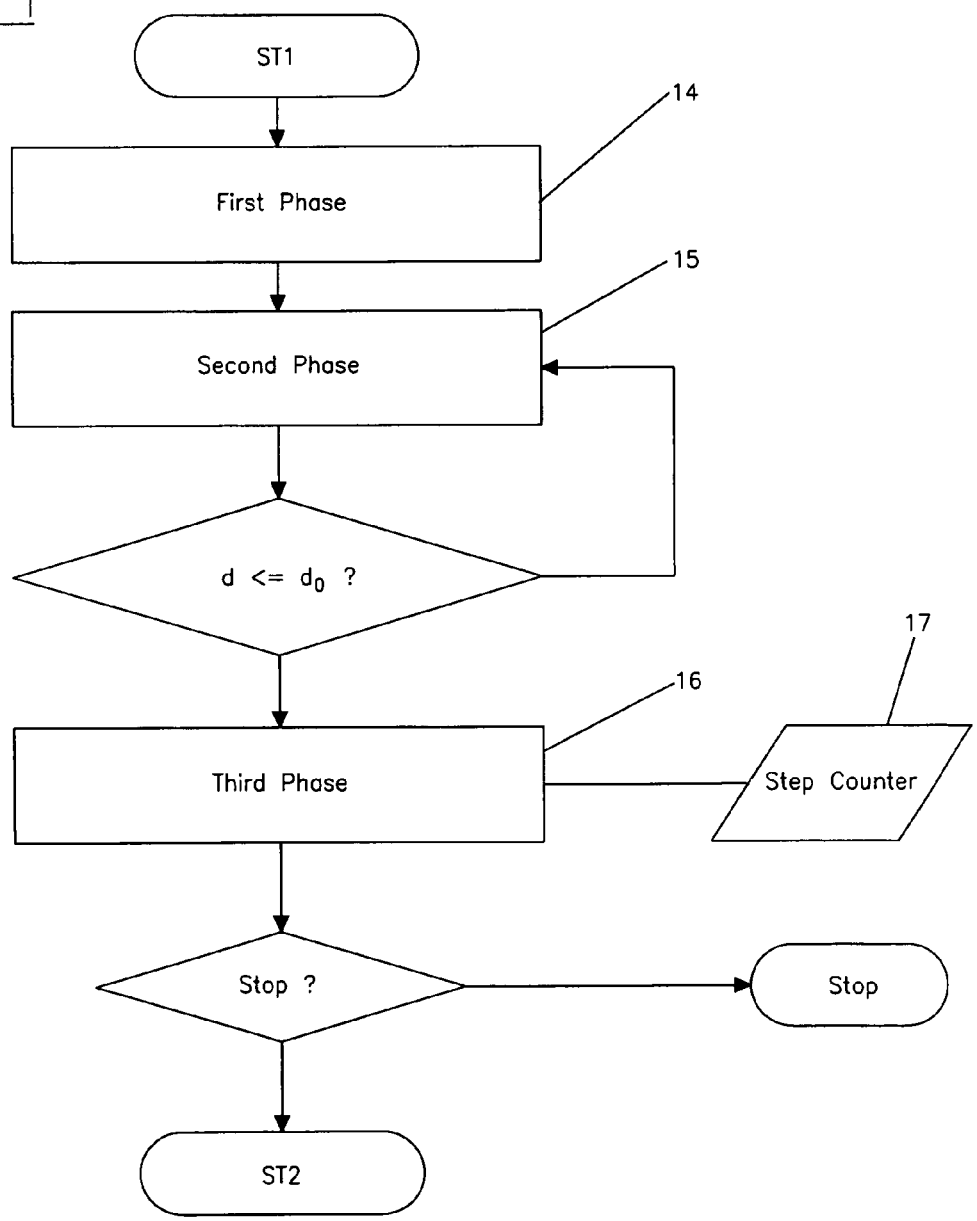

FIG. 11 shows the operations that are performed with regard to the first motor step ST1, i.e. the step from state Z1 to state Z2 (FIG. 9). Motor step ST1 follows the just described start-up step. Thus, in a first phase 14, the current direction in motor winding W1 respectively in driver D1 is reversed and current $I_{PWM}$ for coil W1 is determined anew. Then, in a second phase 15, on- and off-times $T_{ON}$ and $T_{OFF}$ of coil W2 are periodically measured and the associated duty cycle is calculated. At the beginning of a motor step, d increases and subsequently decreases again. When d falls below the stored value $d_0$, the step is completed. Subsequently, in a third phase 16, a step counter 17 is incremented (or decremented in the case of a negative rotation direction). The duration of the step may also be measured. This information is used by the superordinated position and speed control 2 (FIG. 8). Upon reaching a termination criterion, the motor is stopped, otherwise it is commutated to the next motor step ST2.

The operations with regard to the second motor step ST2 correspond to those just presented for step 1, however with two differences: Reversing the direction and setting the amplitude of the winding current apply to coil W2 rather than coil W1 (the direction of the current in coil W1 remains the same), and for the detection of the end of step ST2, the switching times $T_{ON}$ and $T_{OFF}$ required for calculating the duty cycle are measured for coil W1 rather than for coil W2.

The following operations for motor step ST3 are the same as those of step ST1 and the operations for motor step ST4 following after motor step ST3 are the same as those of step ST2.

Commutation control 1 (FIG. 8) supplies the superordinated position and speed control 2 with information regarding the momentary position of the rotor (states according to FIG. 9), the previously covered distance (number of steps in the step counter), and the rotation speed of the motor.

Position and speed control 2 receives the specifications regarding the desired position (number of motor steps in relation to the momentary position) from the superordinated control. If necessary, maximum rotation speed 4 or a defined speed profile are specified. The structure of position and speed control 2 is known in the art.

This control uses current $I_{PWM}$ as the control variable. Thus, the value of duty cycle $d_0$ is also varied in function of current $I_{PWM}$ according to equation 8. Therefore, duty cycle $d_0$ has to be calculated or measured for all values of current $I_{PWM}$.

Using current $I_{PWM}$ as a varying control variable of the position and speed control contradicts the condition that this current should be kept constant (equation 5). This contradiction can be resolved if the value of $I_{PWM}$ is kept constant for the duration of a step and is only adjusted to a new value when the current direction changes.

According to equation 8, supply voltage $U_S$ and winding resistance R influence the detection of the zero crossover of back EMF voltage E directly. If supply voltage $U_S$ and winding resistance R change in operation, this will cause an error in determining the zero crossover of back EMF voltage E. The result is an error regarding the moment of commutation. For that reason, as explained above with reference to FIG. 7, the motor will produce negative torque components. This will lead to a gradual reduction of the torque and to a decrease in rotation speed. The reduced rotation speed is recognized by the position and speed control and compensated by a higher motor current. During the next standstill of the motor, the measurement of the on- and off-times will be repeated and the changes regarding supply voltage and winding resistance will be taken into account.

As shown in equation 7, the winding inductance has no influence on the described method. In the stabilized state, if the current is kept constant (equation 5), the inductance has equal effects on the on- and the off-times of the pulsed drivers.

The information regarding the zero crossover can be used for detecting whether the motor rotates too slowly or is blocked. If the motor rotates too slowly, this is recognized by the rotation speed/step duration measurement. Furthermore, this condition can be recognized by the characteristic of the measured back EMF voltage. If the motor is suddenly blocked in operation, the back EMF voltage of both (or all) motor windings is simultaneously zero. This can be recognized by measuring the on- and off-times of the pulsed drivers.

Two problems and suitable approaches for solving them will be separately presented below. The first one relates to the choice of the clock frequency of the pulsed driver, which can be represented as follows:

$$F = \frac{1 - \frac{R \cdot I + E}{U_S}}{T_{OFF}} \quad (17)$$

This frequency should not be less than a minimum (e.g. because of noise problems), nor should it exceed a maximum (e.g. in order to limit switching losses). In those cases where a constant off-time $T_{OFF}$ is being used, only $T_{OFF}$ can be influenced to adjust clock frequency F, and the choice of an optimum $T_{OFF}$ may be difficult. Therefore, an iterative method is used to bring clock frequency F into the desired range: At standstill of the motor, the pulsed driver is supplied with a constant current and the stationary state is awaited. Subsequently, off-time $T_{OFF}$ is slightly varied and frequency F is thereby iteratively approximated. For stability-related reasons, $T_{OFF}$ should not be varied abruptly. Since the process runs at the switching frequency (>20 kHz) of the pulsed driver, this should only take a short time. The values of $T_{ON}$ and $T_{OFF}$ obtained in this manner are stored and $d_0$ is calculated.

The second problem is related to the fact that duty cycle $d_0$ during the zero crossover of back EMF voltage (equation 8) varies in function of $I_{PWM}$ and $U_S$: A low load torque requires a small current $I_{PWM}$, and vice-versa. Supply voltage $U_S$ may vary due to external factors. If a variation of $U_S$ is detected e.g. by a measurement, the motor would have to be stopped and $d_0$ measured anew at standstill.

Rather than being measured directly, duty cycle $d_0$ is calculated from the measured on- and off-times $T_{ON}$ and $T_{OFF}$. This measurement will subsequently apply to the set values of $I_{PWM}$ and $U_S$. In order to infer different duty cycles $d_0$ respectively on-times $T_{ON}$ for different values of $I_{PWM}$ and $U_S$ from a measurement, complicated calculations are necessary (equations 8 and 9) which may go beyond the computing capacities of a simple microprocessor.

For the presentation of the preferred solution to this problem, it will first be assumed that the value of F, respectively of $T_{ON}+T_{OFF}$, may subsequently be kept constant. Under this condition, the following applies to the duty cycle:

$$d = \frac{T_{ON}}{T_{ON} + T_{OFF}} = T_{ON} \cdot F \quad (18)$$

This means that duty cycle d and $T_{ON}$ are proportional. This is also true for duty cycle $d_0$ at E=0:

$$d_0 = T_{ON0} \cdot F \quad (19)$$

Different values of $I_{PWM}$ or $U_S$ result in different values of $d_0$. For a current $I_{PWM}$ that is greater or smaller by a factor k, the duty cycle at the zero crossover of the back EMF voltage changes proportionally.

$$k \cdot d_0 = \frac{R \cdot (k \cdot I_{PWM})}{U_S} \qquad (20)$$

and thence $$k \cdot d_0 = k \cdot T_{ON0} \cdot F$$

I.e. when $T_{ON}+T_{OFF}$ is kept constant, then $T_{ON0}$ also changes proportionally and can be calculated from the stored value in a simple manner by a single multiplication.

To fulfill the condition $T_{ON}+T_{OFF}=K=$constant, $T_{OFF}$ has to be calculated using the $T_{ON0}$ calculated above:

$$T_{OFF}=K-T_{ON0}. \qquad (21)$$

The condition that $T_{ON}+T_{OFF}=$constant is then only valid in the area of the zero crossover of the back EMF voltage. However, this is sufficient for detecting the zero crossover.

In order to further simplify the calculation of $T_{ON0}$, care can be taken during the adjustment of frequency F of the pulsed driver that a "simple value" results for $T_{ON}$. A "simple value" of $T_{ON}$ at 100% $I_{PWM}$ and $U_S$ would e.g. be $FF or a multiple thereof. The calculation of fractions (or multiples) of $T_{ON}$ is then easily performed by a microprocessor.

Alternatively, $T_{ON}$ at 100% $I_{PWM}$ and $U_S$ can be adjusted to correspond to a pretabulated value. Fractions of $T_{ON}$ can then be read from that same table.

To avoid demanding computation steps such as divisions, the adaptation to a changed supply voltage $U_S$ can be performed in the following manner:

Duty cycle $d_0(U)$ during the zero crossover of the EMF corresponds to $$d(U_s) = \frac{R \cdot I}{U_S} = \frac{R \cdot I}{k \cdot U_0} = \frac{1}{k} \cdot d_0 \qquad (22)$$

where $$U_S = k * U_0$$

$U_S$=momentary supply voltage
$U_0$=supply voltage during the measurement of $d_0$
$d(U)$=zero crossover duty cycle This adaptation of d is performed by changing chopper frequency F, i.e. chopper period $T_{CH}=T_{ON}+T_{OFF}$, for which purpose a multiplication is sufficient. $T_{ON}$ is kept constant and $T_{OFF}$ is calculated from the difference between the new period duration $T_{CH}$ (for EMF=0) and the $T_{ON}$ that is kept constant:

$$T_{CH} = T_{ON} + T_{OFF} = k \cdot (T_{ON0} + T_{OFF0}) = k \cdot T_{CH0} \qquad (23)$$

$$T_{OFF} = T_{CH} - T_{ON}$$

$$= k \cdot T_{CH0} - T_{ON} \qquad (24)$$

Thus, in operation, when both $I_{PWM}$ and $U_S$ may vary, an adaptation instruction for the commutation duty cycle d is obtained which is rapidly executable even by simple processors. It is based on equation (8) while winding resistance R of the motor is assumed to be constant between two measurements of the commutation duty cycle. At the time $t_0$ of the measurement, i.e. generally when the motor is being started, $I=I_0$ and $U_S=U_{S0}$. At a later time $t>t_0$, $I=k \cdot I_0$ and $U_S=j \cdot U_{S0}$. Thus, for the commutation duty cycle, one obtains $$t = t_0: d_0 = \frac{R \cdot I_0}{U_{S0}} = \frac{T_{ON0}}{T_{ON0} + T_{OFF0}} = \frac{T_{ON0}}{T_{CH0}} \qquad (25)$$

$$t > t_0: d = \frac{R \cdot k \cdot I_0}{j \cdot U_{S0}} = \frac{k \cdot T_{ON0}}{j \cdot T_{CH0}} = \frac{T_{ON}}{T_{CH}} \qquad (26)$$

according to which the commutation duty cycle is corrected by calculating independently from each other a corrected $T_{ON}$ and $T_{CH}$:

$$T_{ON}=k \cdot T_{ON0} \qquad (27)$$

$$T_{CH}=j \cdot T_{CH0} \qquad (28)$$

These calculations are easily executable even in processors having a word length of 8 bit (1 Byte) and a correspondingly small computing capacity, thereby also allowing this commutation control to be used in inexpensive motors due to the low price of such simple processors.

Thus, essentially, $T_{OFF}$ is redetermined for a changed operating current $I_{PWM}$ when $U_S$ and $T_{ON}$ vary. The chopper subsequently operates with the new $T_{OFF}$ in accordance with the changed supply voltage. The moment of commutation is defined as soon as the adapted $T_{ON}$ is available, whereas the actual commutation may still be shifted with respect to this moment in function of the operating mode.

During motor startup and the measurement of the commutation duty cycle that is simultaneously being performed according to the invention, also the operating parameters of the chopper for the specified operating current $I_{PWM}$ are adjusted.

If, as set forth above, a particular chopper frequency $$\left(F_0 = \frac{1}{T_{CH0}}\right)$$

is specified, then the following simple procedure may be applied:

1. Specifiy the maximally possible $T_{OFF}$;
2. Await stabilization of $T_{ON}$;
3. Calculate chopper period duration $$T_{ON} + T_{OFF} = \frac{1}{F} = T_{CH};$$

4. If $T_{CH}>T_{CH0}$, reduce $T_{OFF}$ by one increment and repeat the procedure from step 2;
5. $T_{CH}$ is now equal to or slightly smaller than $T_{CH0}$; the momentary values for $T_{ON}$, $T_{OFF}$, $I_{PWM}$ and $U_S$ or values that are derived therefrom are stored as far as they are required for subsequent operation.

The initial value of $T_{OFF}$ for step 1 is greater than $T_{OFF0}$. Another upper limit may be imposed by the value range of the processor that is being used. If words of 1 byte each are used, for example, numbers from 0 to 255 can be represented and $T_{OFF}$ has to be comprised within this range.

Especially in the case of such a limited value range, the mentioned simple method which only uses a stepwise, iterative reduction of $T_{OFF}$ can advantageously be applied.

According to experience, only one or a small number of chopper cycles are necessary for determining a sufficiently stable $T_{ON}$ for a given $T_{OFF}$. In addition, the duration of $T_{OFF}$ decreases nearly continuously rather than abruptly, so that $T_{ON}$ adjusts rapidly as well.

E.g. in the case of a word length of one byte, this adjustment is performed within a duration of one second at the most. In practice, a duration of 100 ms (milliseconds) at the most has been observed.

In this regard, the measurement of $T_{ON}$ can be simplified by the condition that the sum of $T_{ON}$ and the tentatively set $T_{OFF}$ may not or at least not substantially exceed period duration $T_{CH}$ during the measurement.

Figure 12:
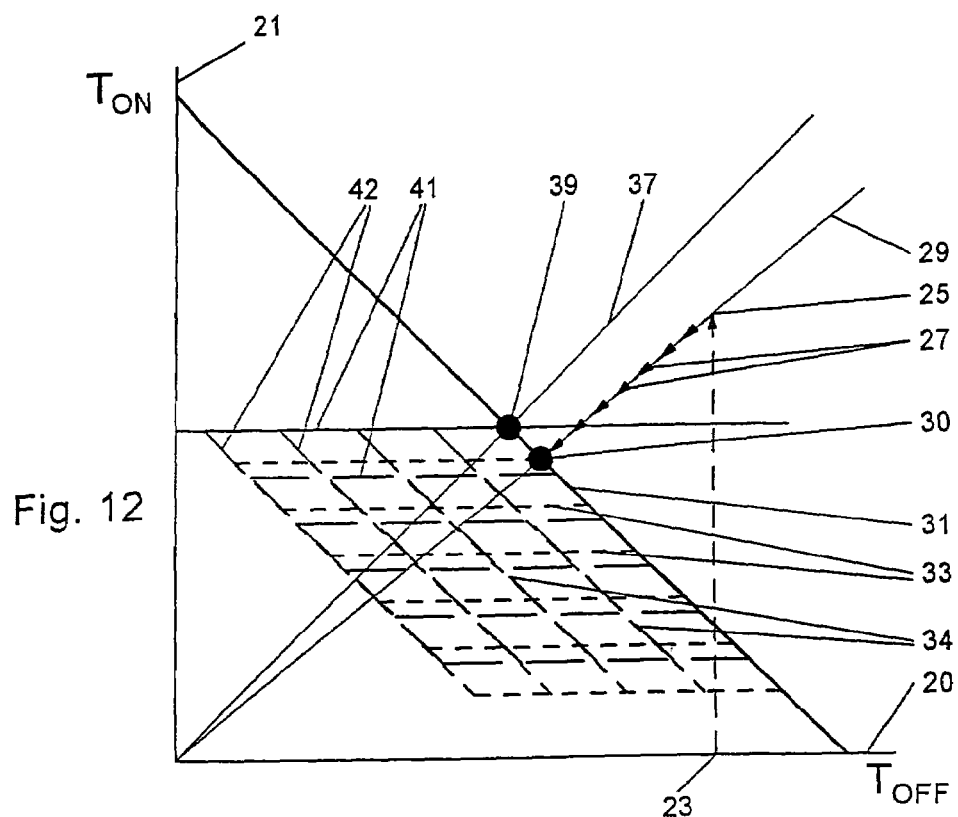

FIG. 12 illustrates the starting measurement for a predetermined $T_{CH}$. $T_{OFF}$ is plotted on abscissa 20 and $T_{ON}$ on ordinate 21. The switched current regulator (chopper) is started using a high $T_{OFF}$ 23. A duty cycle 25 for the momentary combination of $I_{PWM}$, $U_S$, and R results. It will be noted that the motor is now energized but at standstill since no commutation takes place. By a gradual reduction of $T_{OFF}$ (arrows 27), the duty cycle is varied along straight line 29 which is given by equation (8). Thus, when the latter reaches intersection 30 with line 31 for the $T_{CH}$ that is specified for the prevailing operating voltage, the correct operating parameters are established and the motor can be set into rotation. Furthermore, adjacent to intersection 30, the operating area of the motor is indicated by dashed lines 33, 34, which may also extend to the right and above intersection 30.

The commutation duty cycle is shifted along horizontal lines 33 ($T_{ON}$=const) as $U_S$ varies. If $I_{PWM}$ is varied, d is shifted along lines 34, each of which applies to a different $T_{CH}$=const.

Furthermore, to illustrate the situation under different starting conditions, a second d-line 37 for a different combination of $U_S$, $I_{PWM}$, and R is indicated (note: if a different $U_S$ applies, then a different $T_{CH}$ applies, so that line 31 is parallelly displaced). Here, the initialization as described above would result in duty cycle $d_0$ 39, which is the point of intersection of d line 37 and line 31 representing the initial value of $T_{CH}$. The corresponding operating area (lines 41, 42) is displaced along line 31.

Besides, the limits of the operating areas depicted in this figure are not meant to represent real limits. On the contrary, the entire regulating area of the control respectively the entire range of values of the control processor can be utilized while the initial value of duty cycle 30, 39 serves as a point of reference.

According to a variant, an arbitrary $T_{OFF}$ may be preset, e.g. approximately in the middle of a range of values, or selected from a table containing $T_{OFF}$ values in function e.g. of the supply voltage. If this results in a $T_{ON}$ of insufficient length, a substantially larger $T_{OFF}$ is used for starting. As the case may be, this is repeated until a $T_{ON}$ of excessive length results. Then, as described above, $T_{OFF}$ is iteratively reduced in small steps to achieve the best possible approximation to the specified chopper period $T_{CH}$. Chopper period $T_{CH0}$ is preset in function of the supply voltage. Preferably, a corresponding table is provided and the chopper period $T_{CH0}$ that is specified for a given voltage value $U_{S0}$ is simply read out.

In the case of a variation of voltage $U_S$ or of current $I_{PWM}$, the commutation duty cycle is corrected as follows (see above):

$$T_{CH} = j \cdot U_S \tag{29}$$

$$T_{ON} = \frac{T_{ON0}}{I_{PWM_0}} \cdot I_{PWM} \tag{30}$$

As explained above, j is predetermined and invariable. Therefore, the adaptation of $T_{CH}$ requires at most a multiplication, or the value is read out from a table.

The factor $T_{ON0}/I_{PWM0}$ is a function of the measurement $T_{ON0}I_{PWM0}$, however, can often be adjusted such that it can be represented by a power of 2, e.g. hexadecimally $80_{16}$ ($=2^7$). In this case, the division can be simply performed by shifting the binary numbers to the right by a corresponding number of bits, in the example 7 bits. Scaling the digital representation of $I_{PWM0}$ to a power of 2 can be achieved by a suitable design of the chopper, or a corresponding $I_{PWM0}$ is simply preset. $I_{PWM0}$ is already available as a digital value from the chopper control. Determining the applicable factor $T_{ON}/I_{PWM0}$ therefore only requires a small amount of calculation.

Another approach for determining $T_{OFF0}$ starts from a fixed $T_{ON}$ that is calculated from a predetermined current $I_{PWM0}$. Since in switched regulators the current is determined by internal counter values, the required values are available digitally and need not be measured. On the other hand, in this method, the respective $T_{CH}$ has to be calculated from the $T_{CH0}$ detected in the initializing process:

$$T_{ON} = k \cdot I_{PWM} \tag{31}$$

$$T_{CH} = \frac{T_{CH0}}{U_{S0}} \cdot U_S \tag{32}$$

Since the coefficient $$\frac{T_{CH0}}{U_{S0}}$$

is difficult to handle for simple processors, this approach is appropriate for applications where $U_S$ may be regarded as being constant, i.e. is supplied by a sufficiently regulated voltage source. In that case, however, this method is simpler than the one described above as $T_{ON}$ can simply be stored in a table or may even be preset in hard-wired logic and $T_{CH}$ never needs to be adapted. The iterative procedure for determining the initial parameters is the same as indicated above except that steps 3 and 4 are merged in a comparison step in which the measured $T_{ON}$ value is compared to the preset value $T_{ON0}$.

Figure 13:
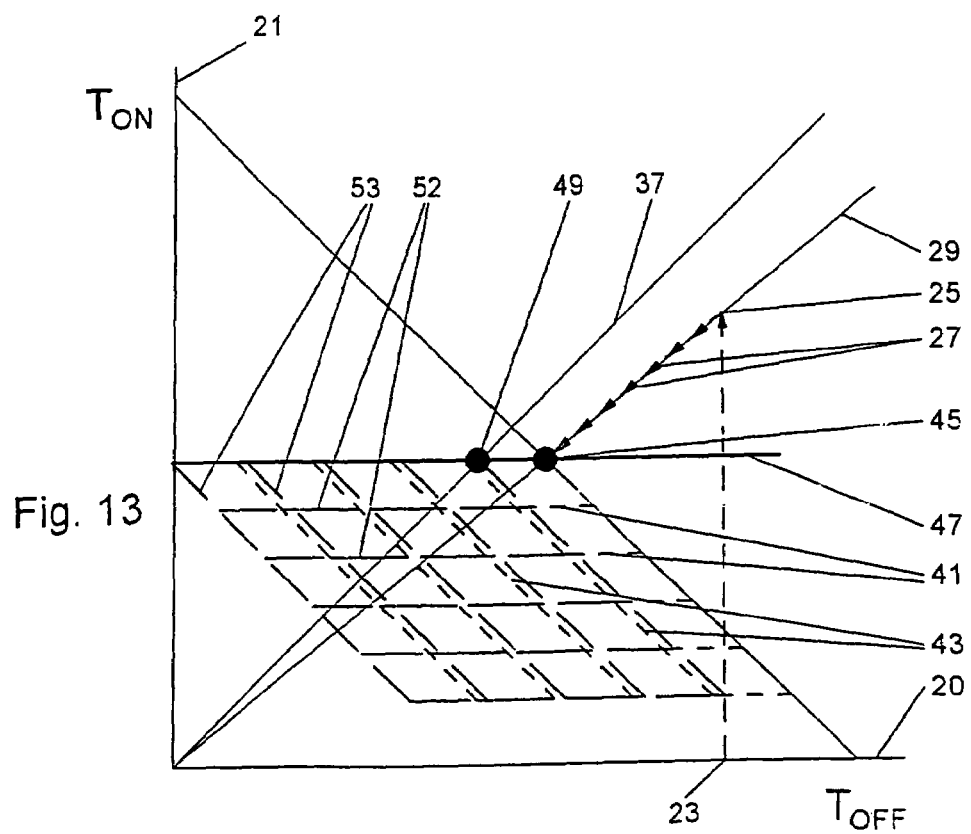

FIG. 13 represents this method in an illustration that is analogous to FIG. 12. Corresponding elements are therefore designated by the same reference signs and will not be further explained. In contrast to the methods where $T_{CH}$ is predetermined, intersection 45 of duty cycle straight line 29 and of line 47 for $T_{ON0}$ is defined as reference duty cycle $d_0$. Correspondingly, $d_0$ values for different initial values of $U_S$, $I_{PWM}$, and R are horizontally displaced like e.g. point of intersection 49 on straight line 37. The operating areas (lines 41, 43 and 52, 53, respectively) are correspondingly displaced as well.

The invention is particularly advantageous for actuators, i.e. electric motors having a relatively low power (1-10 W). It is also advantageously applicable for actuators having one or two windings as in such motors an unenergized winding can only be achieved at the price of high losses in torque or not at all. Actuators of this kind are e.g. found in vehicles for the actuation of ventilation or air conditioning flaps and furthermore in many other locations in modern vehicles.

Based on the present description, further embodiments of the invention will become apparent to those skilled in the art without leaving the scope of the invention. Thus, for example, instead of the pulsed drivers, a regulated power source delivering a continuous constant current might be used for controlling the motor. In this case, the voltage across the windings of the actuator is used instead of the duty cycle.

The invention claimed is:

1. A method for the commutation of electromechanical, commutatorless actuators, more particularly of permanent magnet motors and reluctance motors, having a rotor and a stator including at least one stator winding (W1, W2) that is/are operated with a constant current (I), wherein
a reference constant current is applied to at least one winding (W1, W2) of the actuator,
a stationary state is awaited in which the rotor is at standstill,
a value that represents the voltage applied to the winding of the actuator in the stationary state is determined as the reference commutation value $x_0$ for the commutation voltage,
and while the motor is running, the moment T is determined in which
in the case of an operation with the reference constant current, the reference value appears or is being passed by, or
in the case of an operating current that deviates from the reference current, a commutation value that is calculated from the reference value for the prevailing operating current appears or is being passed by,
and in that the commutation is effected a predetermined time difference after the moment T, which time difference is greater than or equal to zero and is chosen such that essentially no polarity change of the actuator torque occurs.

2. The method according to claim 1, wherein the actuator comprises one or two windings (W1, W2).

3. The method according to claim 1, wherein the time difference is equal to zero.

4. The method according to claim 1, wherein the constant current ($I_{PWM}$) is adjusted by repeatedly switching the supply voltage $U_S$ on during a duration $T_{ON}$ and off during a duration $T_{OFF}$, a switching ratio being equal to $T_{ON}$ divided by the sum of $T_{ON}$ and $T_{OFF}$ (d =$T_{ON}/[T_{ON}+T_{OFF}]$), and the reference commutation value being the reference switching ratio $d_0=T_{ON0}/(T_{ON0}+T_{OFF0})$ or a value that represents the latter.

5. The method according to claim 4, wherein the reference commutation value is on-time $T_{ON}$ while off-time $T_{OFF}$ is constant.

6. The method according to claim 1, wherein during the measurement of the reference commutation value, the constant current is applied to all windings (W1, W2) of the actuator and the reference commutation values for the windings are measured individually in order to be able to perform the commutation at the respective commutation value that is determined for each winding.

7. The method according to claim 1, wherein after applying the reference constant current, a specified time $T_{wait}$ is allowed to elapse after which the stationary state is reached.

8. The method according to claim 1, wherein after applying the reference constant current while the reference commutation value is being measured, one waits until the reference commutation value has no longer changed for a specified time in order to determine that the stationary state has been reached.

9. The method according to claim 1, wherein in the case of an operating constant current $I_S$ that deviates from the reference current $I_0$, the momentary commutation value x is calculated from the reference value $X_0$ by means of the formula:

$$x=x_0*I_S/I_0.$$

10. The method according to claim 5, wherein the sum $T_{CH0}$ of the off-time $T_{OFF0}$ and the on-time $T_{ON0}$ that are applicable for the commutation is kept constant such that $T_{ON0}$ is proportional to switching ratio $d_0$ in order to allow a simpler conversion of $T_{ON0}$ to different operating conditions, more particularly a different operating current and/or voltage.

11. The method according to claim 10, wherein the value of $T_{ON0}$ is set to a value that is convenient for a binary computing unit by varying the sum $T_{CH0}$ during a measurement of the reference commutation value while the motor is at standstill, more particularly a value near the maximum value of the numerical range of the computing unit and/or a value near an integral power of 2.

12. The method according to claim 4, wherein when supply voltage $U_S$ varies, the sum $T_{CH}$ of on-time $T_{ON}$ and off-time $T_{OFF}$ for the commutation switching ratio is determined by means of the formula $$T_{CH} = \frac{U_S}{U_{S0}} \cdot T_{CH0}$$

where $T_{CH0}$ is the sum of the reference switching ratio and $U_{S0}$ is the supply voltage during the measurement of the reference switching ratio.

13. The method according to claim 12, wherein off-time $T_{OFF}$ is determined as the difference between switching time sum $T_{CH}$ and on-time $T_{ON}$ while $T_{ON}$ is not being varied.

14. A device for commutation of electromechanical, commutatorless actuators having a rotor and a stator including at least one stator winding (W1, W2) operated with a constant current (I) comprising:
drivers (D1, D2) for supplying the windings (W1, W2) with a constant current and a control unit (1) comprising a digital processor and a memory, wherein the drivers (D1, D2) receive a control signal from the control unit (1) which determines the current in the associated winding and the control unit receives a respective signal (8) from each driver, which signal is a measure of the voltage applied to the winding,
wherein a program for controlling the processor is stored in the memory upon whose execution by the processor:
a reference constant current is applied to at least one winding (W1, W2) of the actuator,
a stationary state is awaited in which the rotor is at standstill,
a value that represents the voltage applied to the winding of the actuator in the stationary state is determined as the reference commutation value $x_0$ for the commutation voltage,
and while the motor is running, the moment T is determined in which in the case of an operation with the reference constant current, the reference value appears or is being passed by, or in the case of an operating current that deviates from the reference current, a commutation value that is calculated from the reference value for the prevailing operating current appears or is being passed by, and in that the commutation is effected a predetermined time difference after the moment T, which time difference is greater than or equal to zero and is chosen such that essentially no polarity change of the actuator torque occurs.

15. Application of the method according to claim 1 for the vibration-free control of servomotors, more particularly of low power servomotors in vehicles such as actuators for ventilation flaps, hydraulics, pneumatics, and headlights.

* * * * *